(12) United States Patent
Sahli (10) Patent No.: US 11,856,934 B2
(45) Date of Patent: Jan. 2, 2024

(54) PIVOTAL ICE HOLE COVER

(71) Applicant: Michael J. Sahli, Maple Lake, MN (US)

(72) Inventor: Michael J. Sahli, Maple Lake, MN (US)

( * ) Notice: Subject to any disclaimer, the term of this patent is extended or adjusted under 35 U.S.C. 154(b) by 0 days.

(21) Appl. No.: 18/323,398

(22) Filed: May 24, 2023

(65) Prior Publication Data

US 2023/0380398 A1    Nov. 30, 2023

Related U.S. Application Data (60) Provisional application No. 63/346,745, filed on May 27, 2022.

(51) Int. Cl.
*A01K 97/01*    (2006.01)
(52) U.S. Cl.
CPC ................................. *A01K 97/01* (2013.01)
(58) Field of Classification Search
CPC ........ A01K 97/00; A01K 97/10; A01K 97/11; A01K 97/12; A01K 97/125; E04H 15/001; E02D 29/14; E02D 29/1427
See application file for complete search history.

(56) References Cited

U.S. PATENT DOCUMENTS

| | | | |
|---|---|---|---|
| 2,009,132 A * | 9/1932 | Gehris | ................ E02D 29/1427 |
| 3,170,458 A | 2/1965 | Anderlie | |
| 3,466,781 A | 9/1969 | Nelson et al. | |
| 3,694,950 A | 10/1972 | Maier | |
| 3,745,689 A | 7/1973 | Williams | |
| 4,662,099 A | 5/1987 | Stewart | |
| 5,598,656 A | 2/1997 | Strasser | |
| 5,911,569 A | 6/1999 | Isakson | |
| 6,675,523 B1 | 1/2004 | Huiras et al. | |
| 6,935,067 B1 | 8/2005 | Richter et al. | |
| 8,028,947 B1 * | 10/2011 | Schafer | .................. A01K 89/01 |
| | | | 242/251 |
| 8,943,733 B2 | 2/2015 | Katz | |
| 10,524,460 B1 | 1/2020 | Konitzer et al. | |
| 2005/0138856 A1 * | 6/2005 | Hansen | .................. A01K 97/10 |
| | | | 43/21.2 |

(Continued)

FOREIGN PATENT DOCUMENTS

CA    1314146 C    3/1993
CA    1326134 C    1/1994

*Primary Examiner* — Joshua J Michener
*Assistant Examiner* — Henry Hooper Mudd
(74) *Attorney, Agent, or Firm* — Albert W. Watkins (57) ABSTRACT

A pivotal ice fishing hole cover selectively covers a hole in an ice layer over a body of water, while permitting an ice fishing line to pass through and into the water. A ring rests adjacent to and circumscribes the ice fishing opening. A pair of hinges are affixed between the ring and a pair of pivotal lid portions, allowing the lid portions to pivot between a first closed configuration parallel to the ice that blocks the ice fishing opening and a second open configuration that allows access thereto. An ice fishing line opening between the pair of pivotal lid portions remains unobstructed regardless of wether the pivotal lid portions are closed or open. The closure is spring loaded, and with the push of a button will release from the lid, thereby allowing the spring hinges to pivot the lid from closed to open position.

17 Claims, 7 Drawing Sheets

(56) References Cited

U.S. PATENT DOCUMENTS

| | | | |
|---|---|---|---|
| 2010/0307550 A1* | 12/2010 | Silverberg | E04H 15/32 135/116 |
| 2012/0246994 A1* | 10/2012 | Katz | A01K 97/01 43/4 |
| 2017/0064937 A1* | 3/2017 | Christianson | A01K 97/12 |
| 2020/0163320 A1* | 5/2020 | Tibbetts | A01K 97/01 |

* cited by examiner

PIVOTAL ICE HOLE COVER

CROSS REFERENCE TO RELATED APPLICATIONS

The present application claims the benefit of U.S. provisional patent application 63/346,745 filed May 27, 2022 of like title and inventorship, the teachings and entire contents which are incorporated herein by reference.

BACKGROUND OF THE INVENTION

1. Field of the Invention

This invention pertains generally to fishing, and more particularly to an ice fishing hole cover configured to protect an ice fishing hole and fully open on demand.

2. Description of the Related Art

In northern latitudes, during the long winters there is no ability to grow or harvest plants outdoors. However, many of the deeper or spring-fed lakes maintain water below ice, and fish are able to survive the winter months. Consequently, many lakes in the northern latitudes hold bounties of fish, and these fish have long served as an essential source of food.

In addition to fulfilling a basic need for food, many people today find fishing to be a very enjoyable recreational sport. In some cases this may simply be a return to one's roots, or a refreshing visit to what times of old involved. In other cases, the combination of time in the relatively unspoiled outdoors and the opportunity to meet one's basic needs can provide great satisfaction. In yet other cases, the time away from hectic life in the city and opportunity to socialize in a more private environment provides an excellent change of pace. Regardless of the specific reason, millions of individuals at least on occasion continue to participate in the sport.

When a fisherman embarks upon a fishing trip, whether for an afternoon or a multiple day trip, one part of the preparation is the securing of supplies. Frequently, a fisherman will carry many diverse tools, such as an ice auger, various live and artificial baits, hooks, leaders, weights, bobbers, stringers, and the like.

Once supplies have been gathered, an ice fisherman will travel to a suitable location on the frozen surface of a suitable lake. The fisherman will then create a hole through the ice into the water, typically by drilling with an ice auger. Next, the fisherman will pass a fishing line terminated by an artificially or live-baited hook through the hole. The fisherman then waits for an unsuspecting fish to bite or swallow the bait, and then the fisherman will reel the line in and pull the fish through the hole in the ice.

Ice fishing sometimes requires the fisherman to wait for extended time periods for fish to bite. Unfortunately, by the very nature of the location on top of the ice, there is generally little natural shelter available to protect a fisherman from the elements. Consequently, the combination of cold temperatures and wind can be quite brutal. When temperatures fall below zero on the Fahrenheit scale and the winds begin to blow, the hole that the fisherman drilled through the ice freezes up, interfering with the ability to reel in and pull the fish through the hole. In some more unfortunate cases, the hole may completely freeze around the line, making it very difficult for the fisherman to reopen without accidentally cutting the fishing line. As if that is not enough of a challenge, frostbite occurs in only a few minutes on exposed skin. This means the fisherman must also be very careful to stay well bundled in appropriate garments, including boots and gloves. As may be appreciated, severe winter weather can make an otherwise very enjoyable past time into a challenging, brutal, and life threatening experience.

During such a wait, it is decidedly more comfortable to be protected from extreme cold and possible wind gusts which are necessarily associated with the presence of the ice. A shelter, commonly referred to as an ice house or ice shanty, may be used to protect a fisherman from extreme cold and possible wind gusts. Many ice houses are provided with additional amenities such as a source of heat, light, sleeping quarters for longer term stays including in the event of an unexpected blizzard or storm, cooking space, a radio, television, or other entertainment system, shelter for gear, and many other amenities. Understandably, such ice houses have gained wide acceptance.

As is well known, fish are not predictable and may move from day to day to different locations about the lake. A fixed ice house cannot be moved to better fishing locations, while a portable shelter can. Consequently, for a fisherman to have the option of moving to a different location on the ice is of great benefit in the art of ice fishing.

Some artisans have designed portable enclosures that may be transported across ice and snow. These enclosures provide protection from the elements and may be towed by other vehicles. However, other than shelter, some of these are of little further utility to an ice fisherman since they do not provide shelter while still also providing access through the ice to fish.

Some commercial machines and trailers provide both mobility to and from a fishing spot and simultaneously provide access from within the machine or trailer directly to the ice and submerged fish. These greatly facilitate the travel to and from different locations upon the ice through the use of a motorized vehicle. Some of these further allow the machine or trailer to lower and raise, allowing the machine to raise above a heavy snow during transport, while still lowering down to an ice surface for fishing.

These "all-in-one" machines and trailers, particularly those that raise and lower or provide other equivalent access to the waters below, provide an ideal combination of amenities, convenience, and comfort. However, one challenge with these mobile and self-contained shelters is that they are also manufactured to travel within a standard roadway lane. This means that they are confined to only an approximate eight-foot inside width available to the fisherman to move around in. This in turn means there is not much space around any floor openings that provide access to the ice. Unfortunately, this also means that it is easy for a person to accidentally step into the hole, or accidentally drop important or valuable possessions down the hole to be forever lost in the dark freezing waters.

Recognizing the limitations of an open ice fishing hole, including the ability to fall into the hole, the risk of dropping possessions down the hole, and the inherent tendency for an open hole exposed to the cold outdoors to freeze, a number of artisans have designed various ice hole covers. Exemplary U.S. patents, the teachings which are incorporated herein by reference, include: U.S. Pat. No. 3,466,781 by Nelson et al, entitled "Ice fishing accessory"; U.S. Pat. No. 6,675,523 by Huiras et al, entitled "Fishing hole cover system"; and U.S. Pat. No. 6,935,067 by Richter et al, entitled "Ice fishing cover device, kit and method of using". The Huiras et al patent discloses a hole liner and cover that snap together to selectively close a fish hole within a fish house. While this is extremely useful and beneficial when the hole is not in use, it fails to provide any additional benefit when a fishing line is passing through the hole and into the underlying body of water. The Nelson et al patent discloses a hole cover having a removable center, and the Richter et al patent discloses a sliding cover. While these Nelson et al and Richter et al patents definitely offer much advantage over an open hole in the ice, there remains additional challenge. Most notably, these designs do not provide any way to easily remove the cover from the hole. When a fish strikes, the ice hole cover becomes one more obstacle that a fisherman must deal with when their primary focus should be on landing the fish. This can be particularly challenging at night, when there is not sufficient light to clearly distinguish the ice hole cover and fishing line to ensure the two do not become entangled.

Other artisans have provided covers that include a hinged cover that is more easily moved between covered and uncovered positions above an ice hole. Exemplary U.S. and Foreign patents and published applications, the teachings which are incorporated herein by reference, include: U.S. Pat. No. 3,170,458 by Anderlie, entitled "Ice fishing hole heater"; U.S. Pat. No. 3,745,689 by Williams, entitled "Ice fishing box"; U.S. Pat. No. 4,662,099 by Stewart, entitled "Ice free tip up system"; U.S. Pat. No. 5,598,656 by Strasser, entitled "Insulated tip-up"; U.S. Pat. No. 10,524,460 by Konitzer et al, entitled "Ice fishing indicator device"; 2020/0163320 by Tibbetts, entitled "Ice fishing hole cover"; Canadian patent 1,314,146C by Keller, entitled "Ice fishing device"; and Canadian patent 1,326,134C by Hackel, entitled "Ice fishing hole cover and tip up". While the intent of these hinged covers is very good, in practice they are still undesirably cumbersome.

As is well known to most avid fishermen, when a fish strikes the moment is very exciting and stimulating. Unfortunately, very few people will respond with the calm and focus that they have before the fish strike. As a result, even the need to find the actuating point or handle to pivot the lid about the hinge can be a challenge, and is time consuming at the very moment when the fisherman most wants to be setting the hook and reeling in the fish. Some of these also block access to some or all of the hole, interfering with access to the hole and landing of the fish through the hole. Others, similar to the Nelson et al patent described herein above, require the fisherman to separate the cover and the fishing line through a slot or the like, while simultaneously trying to land the fish. As may be appreciated, the need to fumble about and find and grab the cover, pivot the cover, and in some cases further either slip the fishing line from a slot in the cover or maneuver the fish through the cover, all while the fish is swimming and flopping about generally away from the hole or off to the sides unpredictably, is highly undesirable. Yet others require the fisherman to use a line spool or line anchor built into the hole cover, which necessarily lacks the many benefits of modern ice fishing poles. Such impediments have prevented wide acceptance of these types of prior art fishing hole covers.

In U.S. Pat. No. 3,694,950 by Maier, entitled "Sliding cover apparatus for ice fishing hole", the relevant teachings and contents which are incorporated herein by reference, a fisherman is provided with a foot pedal that closes a horizontally sliding cover over the ice hole. This foot pedal allows the fisherman to close the hole once a fish has been landed, thereby ensuring that the fish doesn't accidentally flop about and drop back into the ice hole. While useful for that purpose, the Maier apparatus does not protect the hole during fishing.

U.S. Pat. No. 8,943,733 by Katz, entitled "Ice hole cover", the relevant teachings and contents which are incorporated herein by reference, describes spring loaded hinges 30, 31, swingable half covers 28, 29, and an outer frame 32. However, the springs used to load the hinges only reduce the force required to manually open the half covers. In other words, while these covers are somewhat easier to swing, they must still be opened manually while the fish is moving about on the line, distracting the fisherman from landing the fish.

U.S. Pat. No. 5,911,569 by Isakson, entitled "Ice fishing hole cover and indicator" the relevant teachings and contents which are incorporated herein by reference, describes spring loaded hinges that are triggered by a strike on the fishing line. A trip latch is provided that, when a fish strikes, will rotate and release the cover. The cover then elevates, signaling a strike. While providing a brilliant and innovative solution to many of the disadvantages of other tip-up devices, the Isakson apparatus still has a number of very undesirable drawbacks. Most notably, the fishing line must be properly woven through the trigger apparatus, and the trigger apparatus must remain free of ice, dirt, corrosion, and other impediments sufficiently to trigger properly. Failure of any of the trigger components can lead not only to a loss of fish, but also loss of line and lure or bait. In addition, the fisherman necessarily has no control over the release of the ice hole cover. While desirable from the intent of Isakson to provide visual indication of a fish strike, this automatic opening occurs prior to the fisherman being settled and prepared to deal with the strike. In other words, if the Isakson apparatus is used out on the open ice, the fisherman will need to get to the hole as quickly as possible. Ice is slippery, and in the excitement of the moment the fisherman may slip on the ice and potentially lose more than the fish down the hole. The same concern exists if the Isakson apparatus is used within the close confines of an ice fishing house. The fisherman will be startled by the sudden and unexpected release of the cover, and at this very moment when the cover is needed to protect the hole and the fisherman, the cover is removed therefrom.

As may be apparent, in spite of the enormous advancements and many years of substantial research and development that has been conducted, there still remains a need for an ice hole cover that can be opened selectively and effortlessly by a fisherman at the right moment, and without fear of the cover interfering with the successful landing of fish.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a pivotal ice fishing hole cover. The pivotal ice fishing hole cover comprises a ring configured to rest adjacent to and circumscribe an ice fishing opening. A pair of hinges are affixed to the ring. A pair of pivotal lid portions are each individually affixed to a one of the pair of hinges, and are pivotal relative to the ring between a first closed configuration parallel to an ice layer primarily blocking the ice fishing opening and a second open configuration allowing access to the ice fishing opening. An ice fishing line opening is provided between the pair of pivotal lid portions that remains unobstructed both when the pivotal lid portions are in the first closed configuration and when the pivotal lid portions are in the second open position. At least one spring urges each one of the hinges to lift each one of the pair of pivotal lid portions to the second open position. A lid retainer is configured in the first closed configuration to secure the pivotal lid portions parallel to the ice layer, and further configured to release therefrom, and thereby enable the at least one spring to move each one of the hinges to lift each one of the pair of pivotal lid portions to the second open position.

OBJECTS OF THE INVENTION

Exemplary embodiments of the present invention solve inadequacies of the prior art by providing a pivotal ice fishing hole cover suitable for covering a hole in an ice layer over a body of water, while permitting an ice fishing line to pass through the cover. The cover has a lid that primarily blocks the hole in a first primarily closed position. In this first primarily closed position there is a fish line opening formed in the lid that is relatively smaller than the ice hole opening. The fish line opening extends entirely through the lid, and is configured to permit an ice fishing line to pass through. The lid in a second open position is pivoted about a spring hinge to a position completely uncovering the ice fishing hole, thereby allowing a fisherman full use of the hole without interference from the lid. A closure is provided that, in the lid first primarily closed position, is operative to secure the lid in this position. The closure is also preferably spring loaded, and with the push of a button will release from the lid, thereby allowing the spring hinges to pivot the lid from the first primarily closed position to the second open position.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an ice hole cover that can be opened selectively and effortlessly by a fisherman at the right moment, while otherwise isolating the hole from the space above the hole. A second object of the invention is to provide such a cover that will not interfere with the successful landing of fish. Another object of the present invention is to provide a simple and reliable cover release that is highly resistant to the adverse effects of icing and contamination. A further object of the invention is to provide an ice hole cover that is effective and beneficial both within the confines and close quarters of a fish house and also out in the open, away from any shelter. Yet another object of the present invention is to provide such an ice hole cover that will lay flat on the ice hole, and so not interfere with movement and activities above and adjacent to the hole. An additional object of the present invention is to enable a fisherman to use the pivotal ice hole cover with preferred ice fishing equipment, including any of the myriad of fishing rods, reels, lines, sinkers, baits and the like, and to be able to fully reel in the line when required.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides an ice hole cover that can be opened selectively and effortlessly by a fisherman at the right moment, and without fear of the cover interfering with activities adjacent to the cover or interfering with the successful landing of fish. In the preferred embodiment of the invention illustrated in FIGS. 1-7, a pivotal ice hole cover 101 comprises a ring 110 configured to circumscribe an ice hole, a pair of plate-like lid halves 113, 114 pivotally coupled to ring 110 through a pair of spring hinges 111, 112, and a lid retainer 120 configured to selectively retain the pair of lid halves 113, 114 in the closed configuration illustrated in FIG. 1. Preferred embodiment ice hole cover 101 is suitable for covering a hole in an ice layer over a body of water, while permitting an ice fishing line to pass through the cover.

Ring 110 comprises a plate-like geometry resembling a washer used with bolts. The inside hole within ring 110 is defined by ring lip 147, and has a diameter comparable or greater than that of an ice hole that preferred embodiment ice hole cover 101 will be used to cover. The specific dimensions of ring 110 are not critical to the present invention. Likewise, both of the outside and inside perimeters of ring 110 may take any shape and so are not limited to that of a circle. Nevertheless, for those applications where the diameter and geometry of the hole are known, the inside opening will preferably have a similar or slightly larger dimension, allowing ring 110 to rest above and adjacent to the ice fishing hole while simultaneously avoiding any interference with fishing lines or other objects passing through the interior of the hole.

Figure 1:
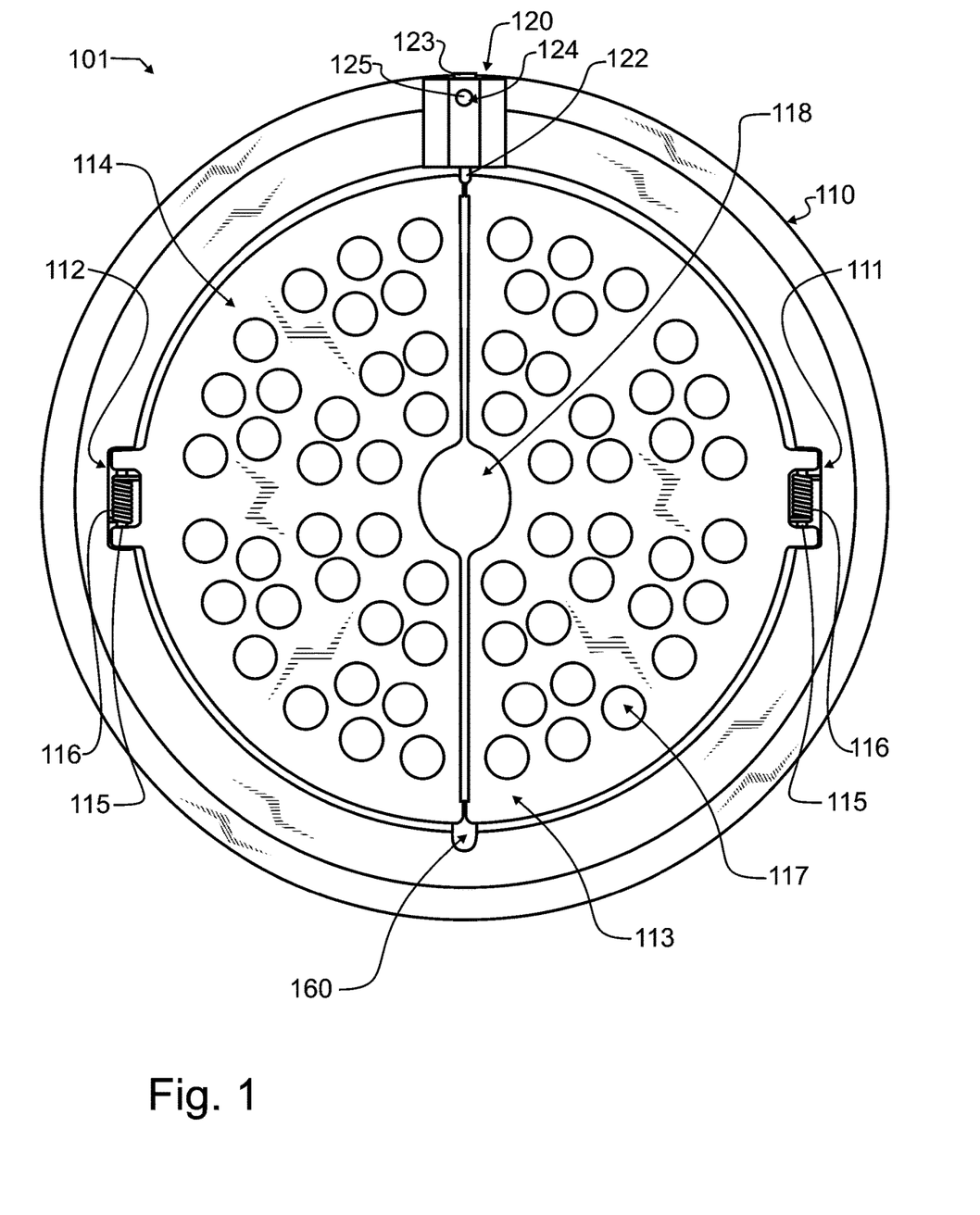
FIGS. 1-3 illustrate a preferred embodiment pivotal ice hole cover designed in accord with the teachings of the present invention with the lid closed from a top, bottom, and side view respectively.

The pair of plate-like lid halves 113, 114 perform the hole-covering function. These lid halves 113, 114 are dimensioned to primarily block the ice fishing hole in a first primarily closed position, as illustrated in FIG. 1. The outer diameter defined by the pair of lid halves 113, 114 will preferably rest upon ring lip 147, thereby providing good support in the event a person or other object presses down onto lid halves 113, 114 toward the ice hole. A lid fishing line hole 118 is defined in the center of preferred embodiment ice hole cover 101 when cover 101 is in the closed configuration that is relatively smaller than the ice hole opening. The lid fishing line hole 118 extends entirely through the lid, and is configured to permit an ice fishing line to pass through. In preferred embodiment ice hole cover 101, lid fishing line hole 118 is formed by small semicircular "mouse-hole" cutouts formed in the otherwise half-circle outer perimeter of each of lid halves 113, 114. While this approach is preferred, the location and geometry of the hole are not critical to the present invention so long as the lid halves 113, 114 may be pivoted freely without interfering with either the fishing line or the landing of the fish. For exemplary and non-limiting purpose, in some embodiments one of the pair of lid halves 113, 114 will have a half-circle perimeter with no cutout for hole 18, while the other of the pair of lid halves 113, 114 will be provided with the entire lid fishing line hole 118 in a dimension large enough to adequately allow fishing line to pass through.

While in preferred embodiment ice hole cover 101 the lid halves 113, 114 are described and illustrated as actually dividing the ice hole opening into two equal portions, in alternative embodiments these lid halves 113, 114 are not actually equal sizes and instead cover unequal portions of the ice fishing hole. For the purposes of the present disclosure, these lid halves 113, 114 will be understood to be either equal in size as in the preferred embodiment, or of different size in alternative embodiments even though still referred to as "halves".

In preferred embodiment ice hole cover 101, lid halves 113, 114 are not only provided with ice fishing line hole 118, but are also provided with any number of perforations 117. Perforations 117 are most preferably configured to meet a plurality of competing objectives.

One objective for perforations 117 is to provide ventilation, allowing for air and thermal exchange between the surface of the water within the ice hole and the shelter. This helps to slow down re-freezing of the hole, and in many cases will keep the hole open without further equipment or work. When lid halves 113, 114 are fabricated from a transparent material, the holes and air exchange also provide decreased fogging and condensation, and improved visibility through the lid halves.

Figure 3:
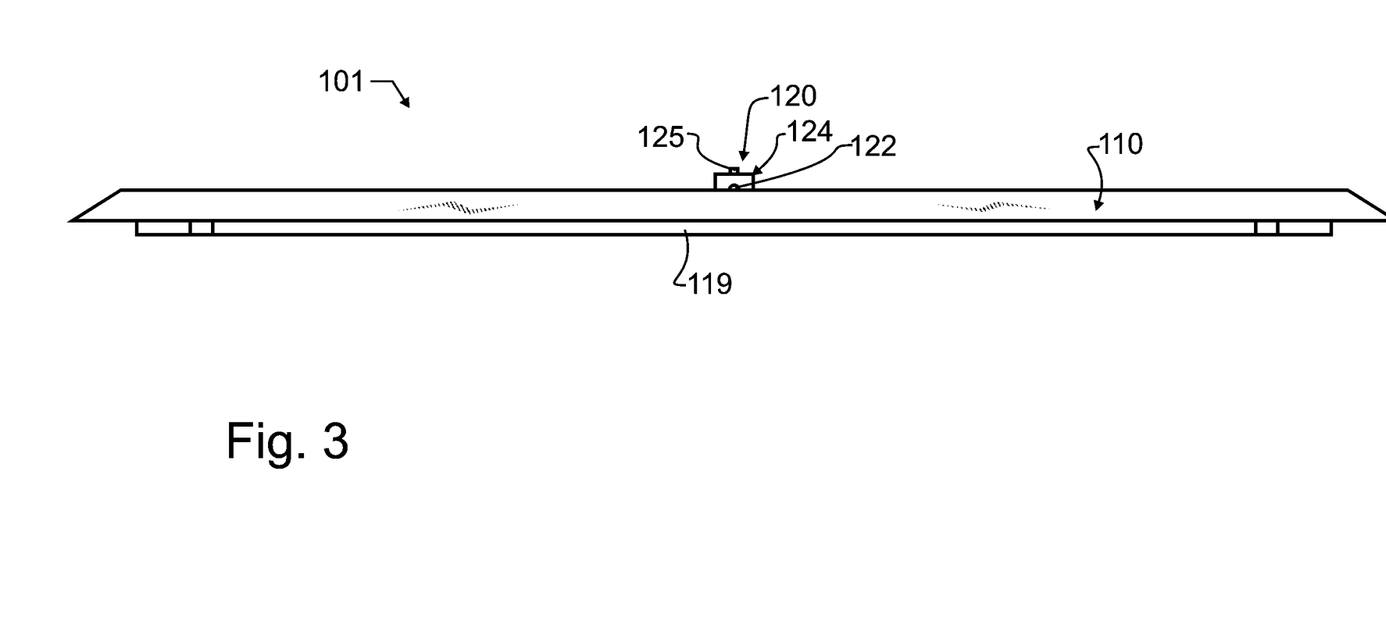
Figure 4:
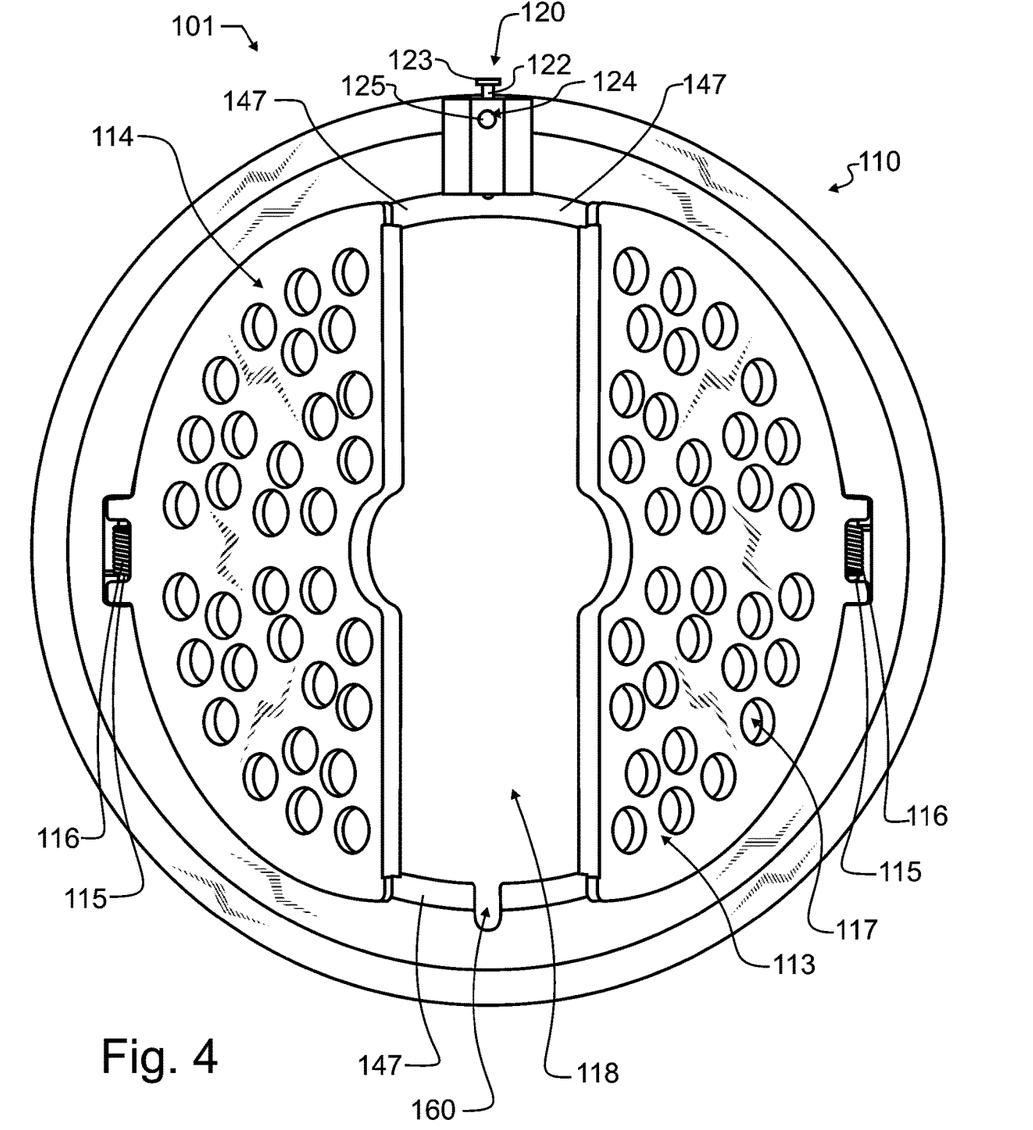
FIG. 4 illustrates the preferred embodiment pivotal ice hole cover of FIG. 1 from a top view showing the lid partially open.

A second objective of perforations 117 is that they are small enough to block keys and other vital items from accidentally dropping into the ice hole when perforate plate-like lid halves 113, 114 are closed, such as illustrated in FIGS. 3 and 4.

Figure 2:
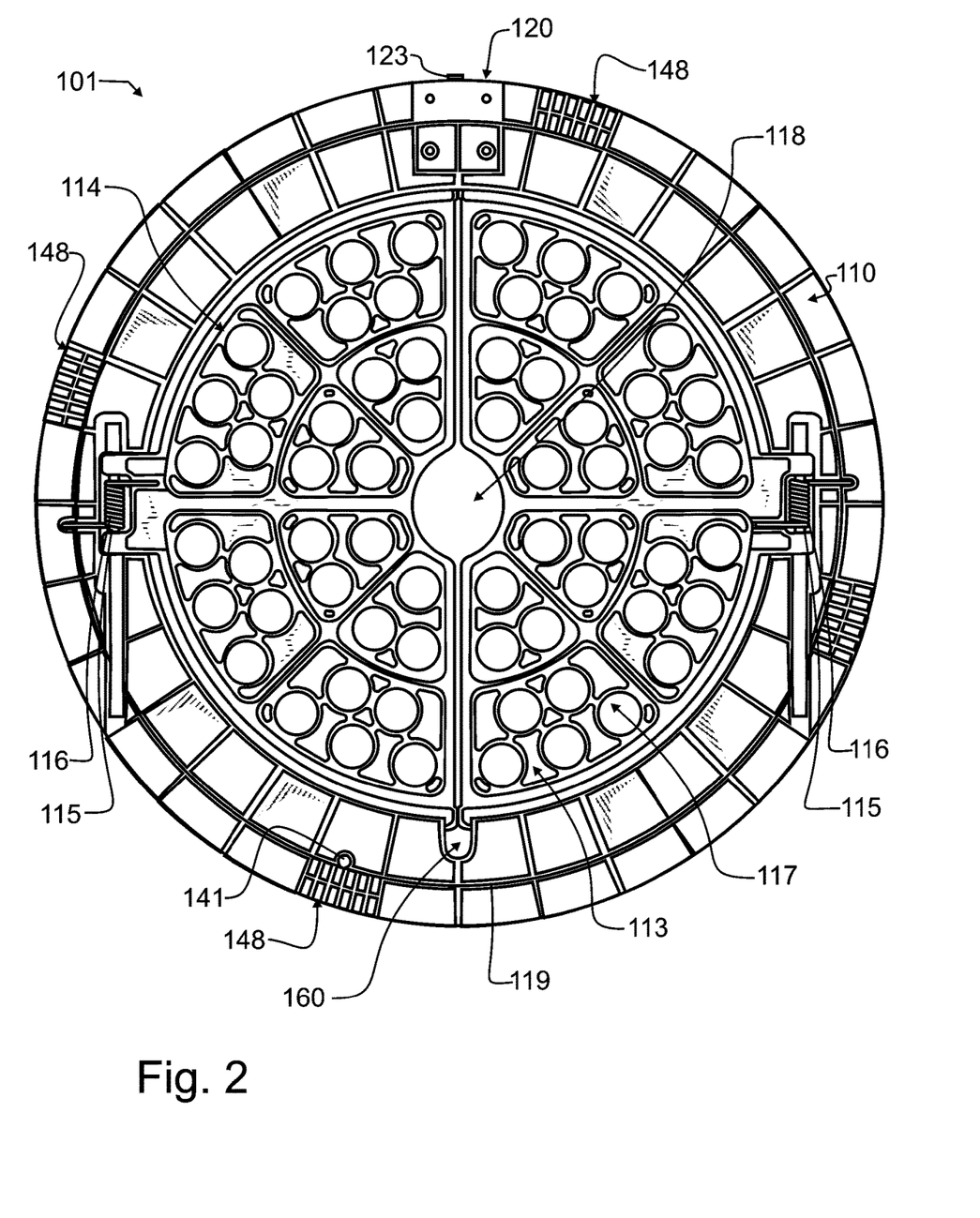

Yet another objective is that perforate plate-like lid halves 113, 114 as defined in combination with perforations 117 can sustain reasonably anticipated forces. Such forces, to be determined by a designer, will preferably include supporting the weight of a small child or toddler who might accidentally step on lid halves 113, 114. As long as lid halves 113, 114 are configured accordingly, then when lid halves 113, 114 are closed as illustrated in FIGS. 1, 2 and 3, a child or toddler that missteps will be saved from being submerged into the icy cold water. Preferably, ring lip 147 will provide additional support for the outer perimeter of lid halves 113, 114, acting as a rotational limit or stop, in the event a significant load is placed on the lid halves.

Yet another objective of perforations 117 is that when lid retainer 120 is activated, there is minimal air drag between the air and the opening lid halves to allow lid halves 113, 114 to open as quickly as possible. While perforations 117 are preferred, for exemplary and non-limiting purpose in some alternative embodiments various louvers and grates will be used to define the perforate plate-like lid halves 113, 114.

In some alternative embodiments, lid halves 113, 114 are substantially imperforate other than the ice fishing line hole 118. In such embodiments, preferred embodiment ice hole cover 101 will act as an insulation layer, helping to keep the ice hole open when preferred embodiment ice hole cover 101 is used on the open ice even in very cold temperatures. As may be apparent then, in different embodiments lid halves 113, 114 may have any number of perforations, with more preferable for sheltered applications and relatively warmer days or climates, and fewer preferred for use on the open ice in extreme weather.

In some alternative embodiments, lid halves 113, 114 are configured to partially overlap. In such alternative embodiments, a shiplap joint is formed by overlapping rabbets cut into opposite faces of lid halves 113, 114 that are in abutting relationship. In such alternative embodiments, this allows more tolerance on the size and positioning of the lid retainer pin 122, since it is then only required to engage with the top one of the two lid halves, and the shiplap joint will hold the other lid halve down in place. In some of these alternative embodiments, the overlapping rabbets will extend entirely across the abutting surfaces, while in other alternative embodiments the overlapping rabbets will only exist through some part or portion of the abutting surfaces, with the remainder of the abutting surfaces having only vertical faces abutting with each other, rather than the combination of vertical and horizontal faces provided by a rabbet. Other types and geometries of mechanical joints and interfaces, besides the vertical and adjacent faces as illustrated in the preferred embodiment or the alternative embodiment rabbets, double rabbets, and shiplap joints described herein, will be understood to be equivalents that are incorporated herein, as will be recognized by those skilled in the mechanical arts upon a reading of the present disclosure.

Lid halves 113, 114 are pivotally coupled to ring 110 through a pair of spring hinges 111, 112. Each one of spring hinges 111, 112 are illustrated as having a combination spring hinge pin 116 that comprises a central pin that is wrapped with a spring 115. The spring applies a bias force against the two lid halves 113, 114 in a direction that tends to force lid halves 113, 114 into the second open position illustrated in FIG. 5. Each one of spring hinges 111, 112 are affixed securely to both of ring 110 and the associated one of lid halves 113, 114 using any suitable fastener and/or technique. While a spring is preferred, in alternative embodiments other equivalents are used to generate the rotary force about spring hinge pin 116, either continuously as generated by the illustrated torsion spring, or intermittently such as by a pedal or foot-operated device. Such apparatuses, for exemplary and non-limiting purposes, include: mechanical devices such as pressure or pedal actuated mechanical linkages, and pneumatic and hydraulic linkages; and electro-mechanical devices such as solenoids, rotary motors, and linear motors, though those familiar with the mechanical and electro-mechanical arts will recognize upon a reading of the present disclosure that there are many other apparatuses too numerous to mention that are equivalent to those mentioned herein.

Figure 5:
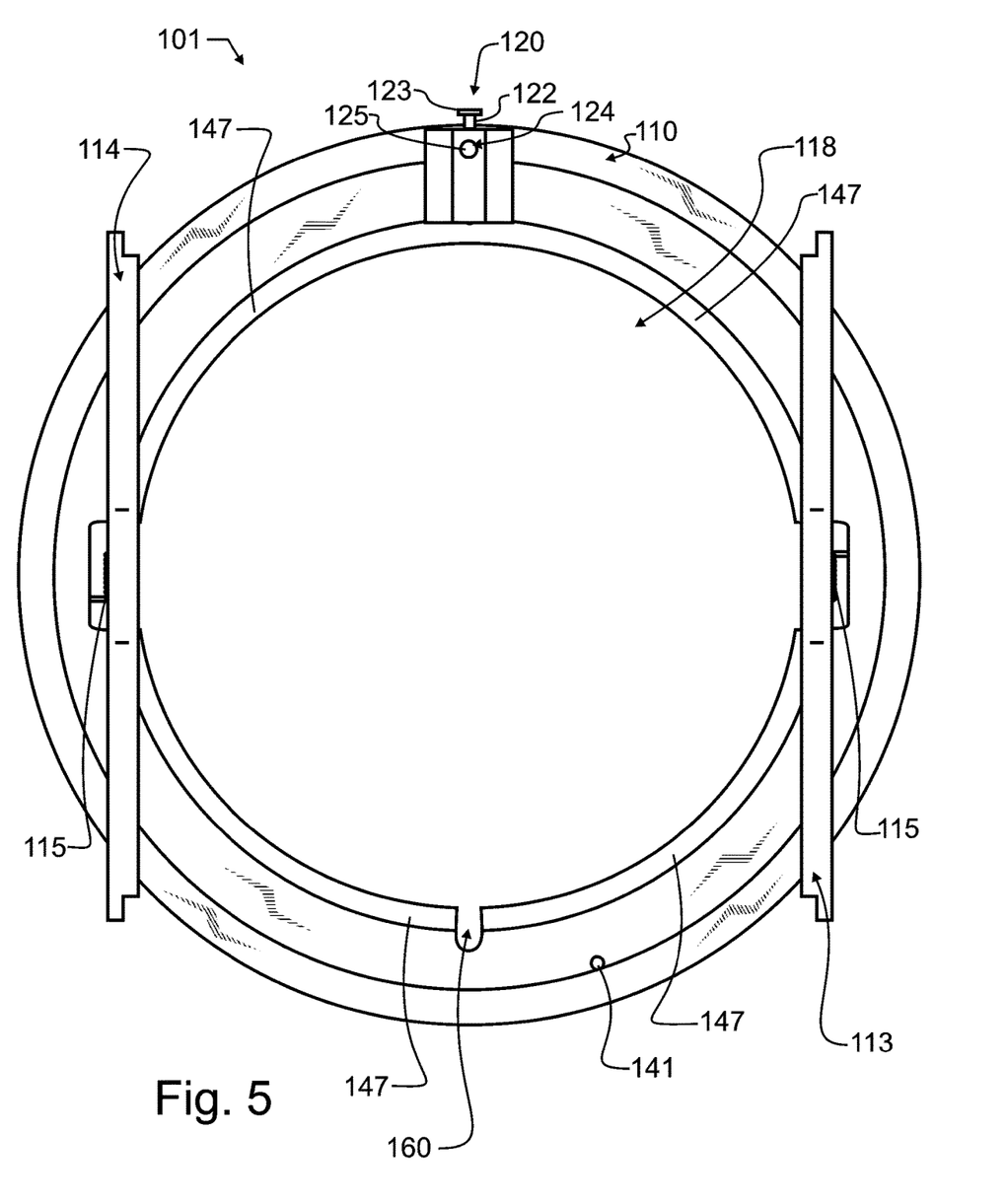
FIG. 5 illustrates the preferred embodiment ice hole cover of FIG. 1 from a top view showing the lid completely open.
Figure 6:
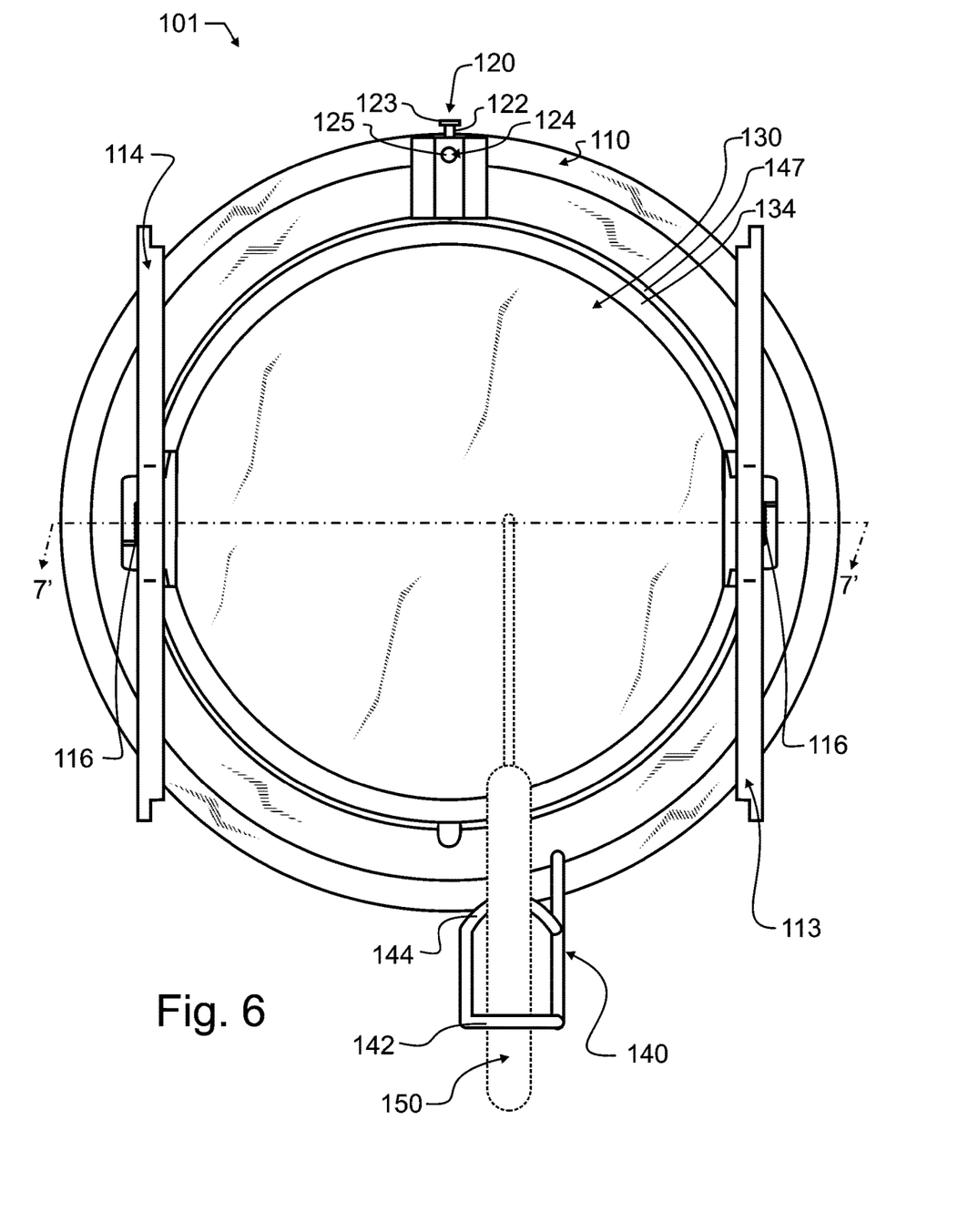
FIG. 6 illustrates the preferred embodiment ice hole cover of FIG. 5 from a top view showing the lid completely open, and with an optional hole cover and an optional rod holder installed.
Figure 7:
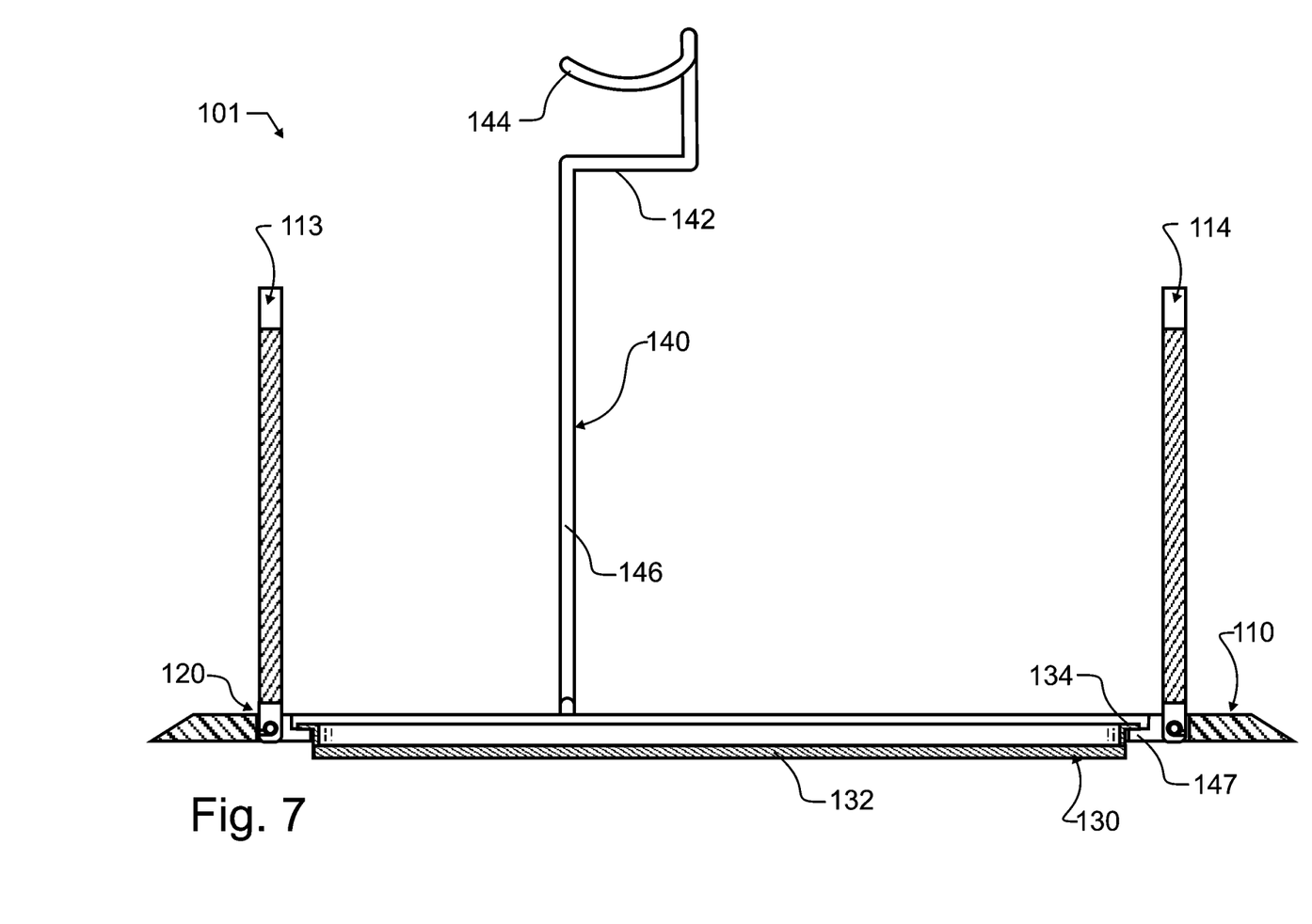
FIG. 7 illustrates the preferred embodiment ice hole cover of FIG. 6 from a sectioned view taken along section line 7'.

A lid retainer 120 is configured to selectively retain the pair of lid halves 113, 114 in the closed configuration illustrated in FIGS. 1 and 7. In preferred embodiment ice hole cover 101, lid retainer 120 has a linearly reciprocating lid retainer pin 122 that, in the closed configuration illustrated in FIG. 1, protrudes out from lid retainer 120 in a direction above at least the outer edges of each individual one of lid halves 113, 114. Lid retainer pin 122 is also preferably spring loaded or biased to a retracted position as illustrated in FIGS. 4, 5 and 6, where lid retainer pin 122 will instead protrude from lid retainer 120 in a direction away from lid halves 113, 114, and away from the center of ring 110. In this retracted position, lid retainer pin 122 is no longer above and retaining lid halves 113, 14 closed. As a result, retraction of lid retainer pin 122 will allow the springs 115 in spring hinges 111, 112 to drive lid halves 113, 114 into the second open position illustrated in FIG. 5.

Lid retainer actuator button 124 is preferably provided to selectively hold lid retainer pin 122 in the protruding position illustrated in FIG. 1, thereby keeping lid halves 113, 114 closed. However, lid retainer actuator button 124 is also preferably configured when pressed to release lid retainer pin 122, allowing an internal lid retainer spring within lid retainer 120 to retract lid retainer pin 122 to the position illustrated in FIGS. 4, 5, and 6. The lid retainer spring geometry is not critical to the present invention. While not illustrated, this geometry may for exemplary purposes in some embodiments comprise a helically wound spring wrapped around lid retainer pin 122, and anchored on a first end against lid retainer pin 122 and on a second distal end against an anchor within lid retainer 120. Consequently, the push of lid retainer actuator button 124 will release lid retainer pin 122 from lid halves 113, 114, thereby allowing springs 115 in the hinges to pivot lid halves 113, 114 from the closed configuration illustrated in FIG. 1 through an intermediate position illustrated in FIG. 4, and finally to the open position illustrated in FIG. 5.

While the construction of lid retainer 120 as illustrated and described herein is most preferred, those familiar with the mechanical and electro-mechanical arts will recognize other known equivalents, including for exemplary and non-limiting purposes a variety of well-known catches and clasps, again either purely mechanical, electro-mechanical, pneumatic or hydraulic, or of other suitable construction and configuration.

As should be visually apparent, when lid halves 113, 114 are in the open position illustrated in FIG. 5, preferred embodiment ice hole cover 101 is designed to keep the ice hole open and accessible, thereby not interfering with the successful landing of fish. The extent of angular rotation of lid halves 113, 114 relative to ring 110 will be determined by those persons reasonably skilled in the art upon a reading of the present disclosure and at the time of design, depending upon several competing objectives. In preferred embodiment ice hole cover 101, lid halves 113, 114 pivot through an angle of rotation of just more than 90 degrees. This keeps the entire area vertically directly above the ice hole open, and yet also ensures that the lid halves do not interfere with any adjacent ice holes. As may be appreciated, in many ice fishing shelters there are a plurality of ice fishing holes that are each in close proximity to each other. Nevertheless, in some alternative embodiments lid halves 113, 114 will pivot through an angle of rotation of approximately 180 degrees. In such embodiments, lid halves 113, 114 are not only removed from the area above the ice fishing hole, but are also essentially entirely out of the way of the ice hole, having pivoted from a closed position in a plane substantially parallel to the ice through an intermediate vertical position perpendicular to the ice and finally to an open position all the way back to a plane substantially parallel to the ice.

Most preferably, the internal spring within lid retainer 120 that tends to retract lid retainer pin 122 to the position illustrated in FIGS. 4, 5, and 6 is a relatively strong spring. Likewise, lid retainer pin 122 will preferably have an exterior longitudinal surface that is smooth, in some embodiments substantially polished, and which optionally may further be coated with a hydrophobic coating or lubricant such as a hydrocarbon grease or oil with or without various additives, and/or such compounds as silicone or polytetrafluoroethylene (PTFE). Between the location of enlarged flat head 123 distal from the ice hole and separated therefrom by the balance of lid retainer 120, the relatively strong spring force, smooth lid retainer pin 122 surface, and any optional hydrophobic coating, any condensation or moisture that might accumulate and form ice at the junction between lid retainer pin 122 adjacent to enlarged flat head 123 will be readily overcome. Similarly, with a constant or decreasing sectional diameter of lid retainer pin 122 more distal to flat head 123 and adjacent to lid halves 113, 114, any ice that might form on lid retainer pin 122 distal to flat head 123 will likewise be easily scraped away during the spring-forced release of lid retainer pin 122. As a result, lid retainer 120 in combination with spring hinges 111, 112 provides a simple and reliable cover release that is highly resistant to the adverse effects of icing and contamination.

In preferred embodiment ice hole cover 101, lid retainer actuator button 124 is oriented to be actuated by motion along a vertical axis, in a direction normal to a plane defined by the ice. In some alternative embodiments using different retainer apparatus, the actuating motion will be a vertical displacement. In either case, this vertical motion or displacement allows a fisherman to grasp the fishing rod with their hands, and at any time step down onto lid retainer actuator button 124 to pivot lid halves 113, 114 from the closed configuration illustrated in FIG. 1 to the open position illustrated in FIG. 5. As a result, preferred embodiment ice hole cover 101 can be opened selectively and effortlessly by a fisherman at just the right moment, while otherwise isolating the hole from the space above the hole.

To reset preferred embodiment ice hole cover 101 from the second open position illustrated in FIG. 5 to the closed position illustrated in FIG. 1, a person may, for exemplary and non-limiting purpose, manually pivot lid halves 113, 114 to the closed configuration illustrated in FIG. 1. While holding the lid halves 113, 114 in the closed configuration, such as by stepping on the lid halves to force them against ring lip 147, a person may next push against enlarged flat head 123 to move lid retainer pin 122 from the position illustrated in FIG. 5 to the closed configuration illustrated in FIG. 1. A catch within lid retainer pin 122 and coupled with lid retainer actuator button 124 then holds lid retainer pin 122 in the position illustrated in FIG. 1.

The geometry of lid retainer pin 122 is that of a cylindrical pin in preferred embodiment ice hole cover 101. Nevertheless, in some alternative embodiments other geometries will be used. For exemplary and non-limiting purpose, the geometry in some alternative embodiments will take on that of a parallelepiped, including in some alternative embodiments a triangular parallelepiped and in other embodiments a rectangular parallelepiped. As may be appreciated, in other alternative embodiments yet other suitable geometries will also be used for lid retainer pin 122.

In further alternative embodiments, and as already noted herein above, other types of closures besides lid retainer 120 are used that in the lid first primarily closed position are operative to secure the lid in this closed position. Such closures, for exemplary and non-limiting purpose, will include other types of spring-loaded catches, electromagnetic solenoids, linear and rotary motors, pneumatic and hydraulic device, and other suitable apparatuses known in the mechanical and electrical arts. Nevertheless, when a fisherman becomes aware of a fish on the line, they will most preferably be able to pivot lid halves 113, 114 from the closed configuration illustrated in FIG. 1 to the second open position illustrated in FIG. 4 nearly instantaneously, and also preferably without having to use their hands. As may be appreciated, the fisherman will likely have a fishing rod in hand, and so will not want to fumble with manually opening lid halves 113, 114. In accord with the teachings of the present invention, the fisherman will simply step onto lid retainer actuator button 124, and lid halves 113, 114 will pop open.

In some cases, particularly where preferred embodiment ice hole cover 101 is used with an enclosure, the fisherman may be sleeping with a line in the water. Typically, a fisherman may employ a rattle reel or other strike indicator to awaken the fisherman and signal that a fish has taken the bait. When this happens, the interior of the ice fishing enclosure may be dark. In order to facilitate proper action by the fisherman, in some embodiments lid retainer actuator button 124 will be illuminated by optional illumination source 125, best visible in FIG. 3, which may, for exemplary and non-limiting purpose, comprise a very low-power and efficient LED, such as a red LED known to interfere only minimally with night vision and sleep cycles. Any suitable power source may be provided for optional illumination source 125, including but not limited to the well known and ready available button cells commonly used with hearing aids.

FIG. 5 shows lid halves 113, 114 in a second open position. Most preferably, lid halves 113, 114 are pivoted to a position completely uncovering the ice fishing hole. As described herein above, lid retainer pin 122 is preferably spring loaded or biased to the retracted position as illustrated in FIGS. 4, 5, and 6, where lid retainer pin 122 protrudes from lid retainer 120 in a direction away from lid halves 113, 114, and away from the center of ring 110. In this retracted position, lid retainer pin 122 is no longer above and retaining lid halves 113, 114 closed. As a result, retraction of lid retainer pin 122 allows spring 115 to drive lid halves 113, 114 into the second open position illustrated in FIG. 5. As also evident from the Figure, in this position there is nothing overhanging the ice hole opening, thereby allowing a fisherman full use of the hole without interference from preferred embodiment ice hole cover 101.

While preferred embodiment ice hole cover 101 has a pair of lid halves 113, 114 that divide the ice hole opening into two equal portions, and have hinges that are located on opposed sides of ring 110 essentially offset from each other by 180 degrees, in alternative embodiments these lid halves 113, 114 may be coupled by hinges that are offset from each other by angles other than 180 degrees without altering the remainder of the operation as described herein. Similarly, in some alternative embodiments, more than two lid portions will be provided. In such alternative embodiments with more than two lid portions, either a mechanical or electrical coupler will be provided to trigger the release of the requisite more than one lid retainer, or mechanical stops will be provided from the two lid portions to other lid portions, such that the stops overlay the lid portions that number greater than two, thereby preventing their release until the first or primary two lid portions release.

From the side view illustration of FIG. 3, it is apparent that preferred embodiment ice hole cover 101 is very thin, and so rises above the ice or a shelter ice hole opening minimally. Also visible in FIG. 3 is an optional ice hole sleeve 119 that is not illustrated in the other drawing Figures. Ice hole sleeve 119 is most preferably thin, and configured to slip inside of an ice hole opening, preferably with a minimum amount of play or difference in diameter therebetween. By keeping ice hole sleeve 119 thin, and dimensioned to fit snugly within the ice hole, there will be very minimal interference with the removal of a fish from within the ice fishing hole. Noteworthy here is that a number of ice fishing houses and trailers have openings in the floor, in some cases with tubes attached that couple down to the ice surface, in other cases with a small gap between the opening and the ice, and in yet other cases that directly engage with the ice surface. In at least some of these instances, optional ice hole sleeve 119 will be configured to be an insert that is placed into the opening 118 and sits on the edge 132.

While optional ice hole sleeve 119 is illustrated as a continuous band, in other alternative embodiments two or more incomplete arcuate segments are provided. In some of the alternative embodiments including arcuate segments, the arcuate segments are supported on an adjustable connection to ring 110, allowing the diameter of the arcuate segments to be adjusted to match a particular hole. In some embodiments, flat plates are used instead of arcuate segments. In yet other embodiments, spring fingers are used to accommodate a range of ice hole diameters. As will be apparent to those reasonably skilled in the mechanical arts, in other alternative embodiments yet other alternative apparatuses to securely locate ring 110 relative to or into the ice hole and known from the mechanical arts will be substituted for ice hole sleeve 119.

When preferred embodiment ice hole cover 101 is used in a portable ice house, in some cases it is desirable to have no fixed ice hole sleeve 119 and instead to affix the ring 110 to the floor of the ice house using any suitable fastener. In preferred embodiment ice hole cover 101, and as best visible in FIG. 2, a plurality of specially formed fastener pads 148 are provided that provide sufficient surface area to attach hook and loop fasteners. In alternative embodiments, other suitable fasteners are used, for exemplary and non-limiting purposes including glues and adhesives, double-sided tape, screws, bolts, and nails.

An optional fishing rod holder 140, also illustrated in FIGS. 6 and 7, is inserted into optional hole 141. A vertical riser 146, rear rod support 142 and curved front rod support 144 together support a prior art fishing rod 150, as shown in FIG. 6. Ideally, vertical riser 146 is taller than the lid halves 113, 114 so that it is out of the way of both lid halves 113, 114 when the lid is released. The provision of fishing rod holder 140 enables a fisherman to use the preferred embodiment ice hole cover 101 with many different types of commercially available ice fishing equipment, including most of the myriad of fishing rods, reels, lines, sinkers, baits and the like, and allows the fisherman to fully reel in the line when required.

When preferred embodiment ice hole cover 101 is used out on the open ice a screw, nail, or other suitable ice fastener can be inserted through optional hole 141 to keep the ice hole cover in position over any hole in the ice. The screw, nail, or other suitable ice fastener in some embodiments is provided as an integral extension to fishing rod holder 140, extending downward from vertical riser 146, while in other embodiments the fastener is a separate component that may be used with or alternatively to fishing rod holder 140.

When preferred embodiment ice hole cover 101 is not being used for fishing purposes, such as during transport and storage, an optional hat shaped hole cover 130 illustrated in FIGS. 6 and 7 can be placed inside of the lid fishing line hole 118, with brim 134 resting on ring lip 147 while basin 132 sits below the closed lid halves 113, 114. The optional hole cover 130 can help prevent road spray from entering the portable ice house while it is being transported, and can help keep warm air in the ice house when it is not being used to catch fish.

An optional light, not illustrated, may be provided within or affixed to ring 110 arranged to illuminate down into the water, making it easier for a fisherman to observe the bait and fish when looking into the ice hole. In such case, the light may also provide general illumination to the fish house when lid halves 113, 114 are opened.

Many fishermen also prefer to use a fish finder or camera to locate fish. To allow a fish finder wand or camera cable to pass in a non-interfering manner into the ice hole, an optional cable passage 160 is provided.

Preferred embodiment ice hole covers 101 may be manufactured from a variety of materials, including metals, resins and plastics, ceramics or cementitious materials, or even combinations, laminates, or composites of the above. The specific material used may vary, though special benefits are attainable if several important factors are taken into consideration. First, preferred embodiment ice hole cover 101 will be exposed to water and wide temperature extremes. Many different plastic and resinous materials, composites, and laminates, ceramics, stainless steel, aluminum, and well-coated and/or plated metals such as zinc-plated and optionally resin dipped or powder coated metals all are known to have this corrosion resistance and wide temperature range tolerance. In addition, it is preferable that all materials are sufficiently tough and durable to not fracture, even when great forces are applied thereto. This not only allows less material to be used in the fabrication of preferred embodiment ice hole cover 101, but also helps to ensure the safety of a person or child who might accidentally step onto the cover. A low mass material is preferred for lid halves 113, 114 which allows a lower force spring 115 to be used while improving the speed of rotation of the affixed lid halves. For exemplary and non-limiting purpose, materials that generally provide this combination of features and characteristics desired in lid halves 113, 114 include polycarbonate resins, various styrene and acrylic resins, some types of higher molecular weight polyethylene, and various copolymers of the foregoing. Various fillers and additives may be incorporated as well into the plastic, as is known in the art of plastic fabrication. The many ribs visible from the underside as illustrated in FIG. 2 provide added strength with a less significant weight increase, as is known in the art of plastic molding and forming.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. Further, features and design alternatives that would be obvious to one of ordinary skill in the art are considered to be incorporated also. The scope of the invention is set forth and particularly described in the claims herein below.

I claim:

1. A pivotal ice fishing hole cover, comprising:
   a ring configured to rest adjacent to and circumscribe an ice fishing opening;
   a pair of hinges affixed to said ring;
   a pair of pivotal lid portions, each one of said pair of pivotal lid portions affixed to a one of said pair of hinges and pivotal relative to said ring between a first closed configuration parallel to an ice layer primarily blocking said ice fishing opening and a second open configuration allowing access to said ice fishing opening;
   an ice fishing line opening between said pair of pivotal lid portions that remains unobstructed both when said pivotal lid portions are in said first closed configuration and when said pivotal lid portions are in said second open configuration;
   at least one spring urging said each one of said hinges to lift each one of said pair of pivotal lid portions to said second open configuration; and
   a lid retainer configured in said first closed configuration to secure said pivotal lid portions parallel to said ice layer, and further configured to release therefrom, and thereby enable said at least one spring to move said each one of said hinges to lift each one of said pair of pivotal lid portions to said second open configuration.

2. The pivotal ice fishing hole cover of claim 1, wherein said lid retainer comprises:
   a lid retainer spring biasing said lid retainer toward said second open configuration; and
   a lid retainer actuator button configured to hold said lid retainer in said first closed configuration until said lid retainer actuator button is pressed, and to release said lid retainer when said lid retainer actuator button is pressed, whereby pressing said lid retainer actuator button will cause said lid retainer spring to reciprocate said lid retainer from said first closed position to said second open configuration.

3. The pivotal ice fishing hole cover of claim 2, wherein said lid retainer further comprises:
   a lid retainer pin having a longitudinal axis extending in a plane parallel to said ice layer and reciprocal along said longitudinal axis;
   said lid retainer pin extending interior of said ring inner diameter and engaging said pair of pivotal lid portions in said first closed configuration and extending entirely exterior of said ring inner diameter in said second open configuration; and
   said lid retainer spring biasing said lid retainer pin toward said second open configuration.

4. The pivotal ice fishing hole cover of claim 3, wherein said lid pin comprises a shaft body and a flat head having a greater diameter than said shaft body and terminating said shaft body distal to said ring inner diameter.

5. The pivotal ice fishing hole cover of claim 3, wherein said lid pin button further comprises an illumination source.

6. The pivotal ice fishing hole cover of claim 1, wherein said pivotal lid portions are each configured to pivot through an angle of rotation of more than 90 degrees relative to said ring.

7. The pivotal ice fishing hole cover of claim 5, wherein said pivotal lid portions are each removed from the entire area above said ice fishing opening when in said second open configuration.

8. The pivotal ice fishing hole cover of claim 5, wherein said pivotal lid portions are each configured to pivot through an angle of rotation of approximately 180 degrees relative to said ring.

9. The pivotal ice fishing hole cover of claim 1, further comprising a hole cover having a basin supported beneath a brim, said brim supported by said ring and fully closing a central opening in said ring.

10. The pivotal ice fishing hole cover of claim 1, further comprising a portal between said ring and at least one of said pair of pivotal lid portions, said portal configured to pass an electrical cable from a top surface of said pivotal ice fishing hole cover to a bottom surface of said pivotal ice fishing hole cover.

11. The pivotal ice fishing hole cover of claim 10, wherein said electrical cable comprises a depth finder cable.

12. The pivotal ice fishing hole cover of claim 10, wherein said electrical cable comprises a fish finder cable.

13. The pivotal ice fishing hole cover of claim 1, further comprising a fishing rod holder attached to said ring and configured to support an ice fishing rod relative to said ring.

14. The pivotal ice fishing hole cover of claim 1, further comprising a stake configured to attach said ring to a surface circumscribing said ice fishing opening.

15. The pivotal ice fishing hole cover of claim 1, wherein said ice fishing opening comprises a hole in said ice layer.

16. The pivotal ice fishing hole cover of claim 1, wherein said ice fishing opening comprises a hole in an ice fishing shelter.

17. The pivotal ice fishing hole cover of claim 1, wherein a first one of said pair of pivotal lid portions has an identical geometry to a second one of said pair of pivotal lid portions.

* * * * *